(12) United States Patent
Park (10) Patent No.: US 7,430,421 B2
(45) Date of Patent: Sep. 30, 2008

(54) METHOD FOR CONTROLLING SLEEP MODE IN WIRELESS ACCESS COMMUNICATION SYSTEM

(75) Inventor: Jeong-Hoon Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 614 days.

(21) Appl. No.: 10/911,944

(22) Filed: Aug. 5, 2004

(65) Prior Publication Data

US 2005/0075148 A1    Apr. 7, 2005

(30) Foreign Application Priority Data

Sep. 1, 2003   (KR) .................. 10-2003-0060930
Jun. 24, 2004  (KR) .................. 10-2004-0047751

(51) Int. Cl.
*H04Q 7/20* (2006.01)
(52) U.S. Cl. .............. 455/456.1; 455/434.1; 455/434.2; 455/404.2; 370/311
(58) Field of Classification Search .............. 455/456.1, 455/434.1–434.4, 404.2; 370/311
See application file for complete search history.

(56) References Cited

U.S. PATENT DOCUMENTS

| | | | | |
|---|---|---|---|---|
| 5,233,643 | A * | 8/1993 | Naeini et al. .............. 455/456.1 |
| 5,349,695 | A * | 9/1994 | Zhong et al. .............. 340/7.32 |
| 5,440,541 | A * | 8/1995 | Iida et al. .................... 370/352 |
| 5,519,403 | A * | 5/1996 | Bickley et al. .............. 342/352 |
| 6,137,772 | A * | 10/2000 | Turcotte et al. ............. 370/329 |
| 6,622,251 | B1 * | 9/2003 | Lindskog et al. ............ 713/300 |
| 6,710,702 | B1 * | 3/2004 | Averbuch et al. ............ 340/7.1 |
| 6,965,297 | B1 * | 11/2005 | Sandahl ..................... 340/7.25 |
| 7,130,668 | B2 * | 10/2006 | Chang et al. ................. 455/574 |
| 2004/0106431 | A1 * | 6/2004 | Laroia et al. ............. 455/552.1 |
| 2005/0049013 | A1 * | 3/2005 | Chang et al. ................. 455/574 |
| 2005/0186973 | A1 * | 8/2005 | Gaal et al. .................. 455/458 |
| 2005/0197123 | A1 * | 9/2005 | Chang et al. ................ 455/436 |
| 2006/0112183 | A1 * | 5/2006 | Corson et al. ............... 709/230 |
| 2006/0223550 | A1 * | 10/2006 | Zhang et al. ............... 455/458 |
| 2006/0240832 | A1 * | 10/2006 | Kim et al. ................... 455/438 |

FOREIGN PATENT DOCUMENTS

CN    1354939    6/2002

(Continued)

OTHER PUBLICATIONS

Stanwood, "Supporting Material for Comments on Sleep Mode", IEEE 802.16 Broadband Wireless Access Working Group, Jul. 11, 2003.

*Primary Examiner*—Matthew Anderson
*Assistant Examiner*—Minh D Dao
(74) *Attorney, Agent, or Firm*—The Farrell Law Firm, PC (57) ABSTRACT

A method for controlling a sleep mode in a wireless access communication system is disclosed. In the method, a base station and a subscriber terminal share a predetermined number of SI for a sleep mode control, and the base station sets a paging position by means of a predetermined BCID assigned to subscriber terminals and the SI, so that the base station can easily manage sleep intervals of the subscriber terminals. Further, since information for a sleep interval scheduling is not transmitted when the subscriber terminal shifts to a sleep mode, the amount of traffic between the subscriber terminal and the base station can be reduced.

21 Claims, 10 Drawing Sheets

FOREIGN PATENT DOCUMENTS

| | | |
|---|---|---|
| CN | 1424859 | 6/2003 |
| EP | 0 896 489 | 2/1999 |
| JP | 11-112405 | 4/1999 |
| WO | WO 00/60811 | 10/2000 |
| WO | WO 01/69859 | 9/2001 |
| WO | WO 03/051077 | 6/2003 |

* cited by examiner

METHOD FOR CONTROLLING SLEEP MODE IN WIRELESS ACCESS COMMUNICATION SYSTEM

PRIORITY

This application claims priority to an application entitled "Method for controlling a sleep mode in wireless access communication system" filed in the Korean Intellectual Property Office on Sep. 1, 2003 and Jun. 24, 2004 and assigned Serial Nos. 2003-60930 and 2004-47751, respectively, the contents of each of which are incorporated herein by reference.

BACKGROUND OF THE INVENTION

1. Field of the Invention

The present invention relates to a wireless access communication system, and more particularly to a method for controlling a sleep mode in a wireless access communication system.

2. Description of the Related Art

In a conventional cellular network [e.g. a Code Division Multiplex Access (hereinafter, referred to as a CDMA) network, a Global System for Mobile Communication (hereinafter, referred to as a GSM) network, etc.], a slotted paging method is used for achieving a sleep mode. That is, when terminals operating in the conventional cellular network are not in an active mode, the terminals operate in a sleep mode, in which power consumption is reduced. The terminals periodically awake from the sleep mode to determine if messages have been received. The terminals are shifted to the active mode only when messages have arrived; otherwise, the terminals re-enter the sleep mode.

In the slotted paging method, since a paging slot, which in monitored by the terminal itself, is predefined between a base station and the terminal, each terminal has only to awake at the appointed paging slot in order to check its own paging message. For instance, a paging slot is defined for each terminal in a CDMA system, and a paging group is defined for each group of terminals in a GSM system. Accordingly, CDMA and GSM terminals have only to awake during the predetermined time periods. The predetermined time periods are fixed values specified by a system, and thus are easily realized and managed in the system.

However, in a wireless access communication system (also known as a $4^{th}$ generation communication system) the supports high speed services, it is difficult to control a sleep mode. The reason for the difficulty in control is that in an IEEE 802.16e communication system, which additionally considers mobility of a subscriber terminal as compared with an IEEE 802.16a communication system, a sleep mode has a sleep interval that is increased according to an exponential power of 2 of an initial sleep interval (or twice as large as a previous sleep interval). It is not simple process to manage a sleep mode starting point of time, a sleep interval, and an awaking point of time for each of a plurality of subscriber terminals, and therefore it is difficult to control the sleep mode in the IEEE 802.16e communication system.

Figure 1:
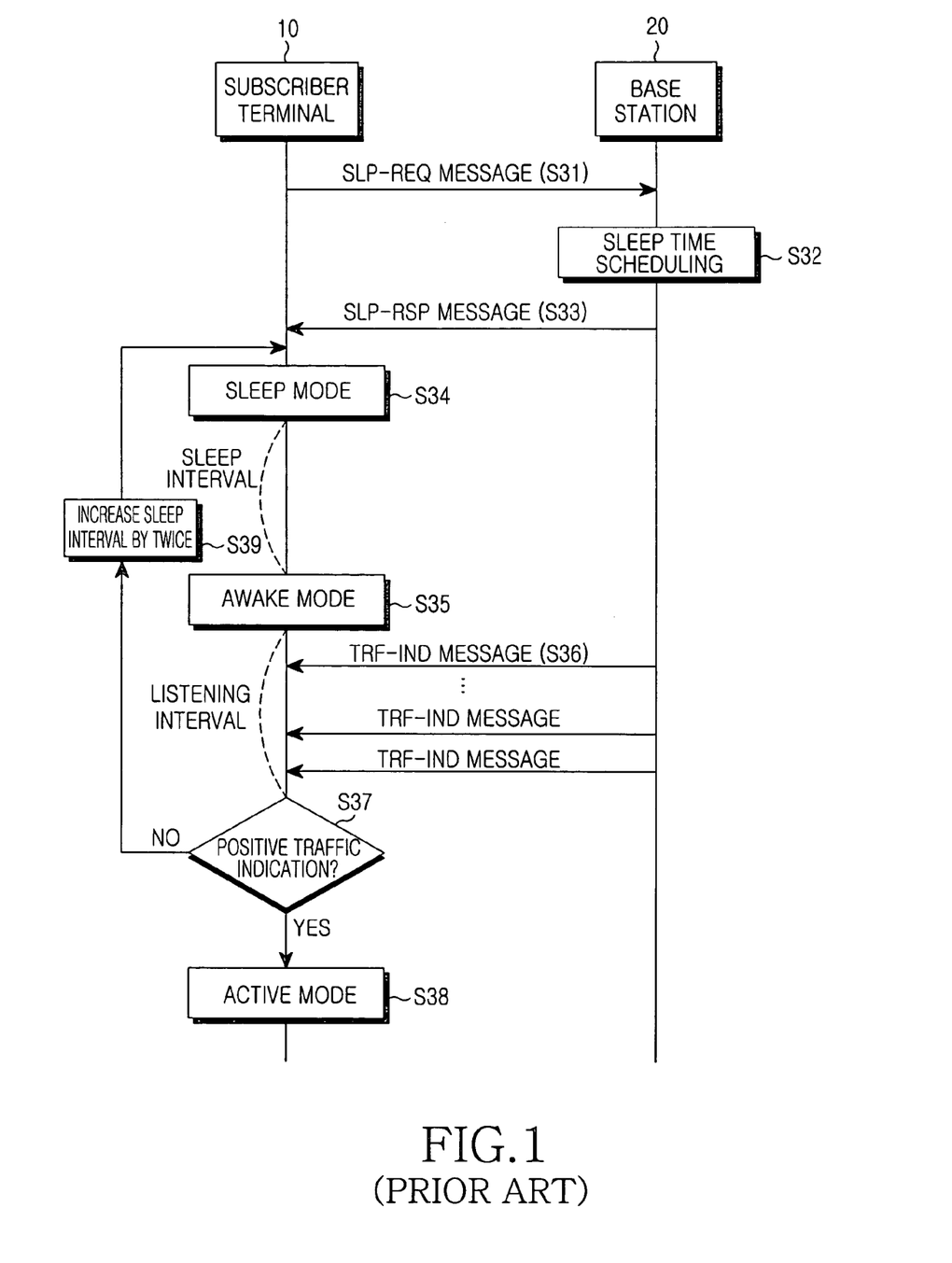
FIG. 1 is a flowchart illustrating a conventional sleep mode controlling method.

FIG. 1 is a flowchart illustrating a conventional sleep mode controlling method proposed by the IEEE 802.16e communication system. Typically, controlling a sleep mode of the IEEE 802.16e communication system begins with either a subscriber terminal request or by control of a base station. Herein, FIG. 1 illustrates a sleep mode controlling method which is started by a subscriber terminal request.

Referring to FIG. 1, a subscriber terminal 10, which desires to enter a sleep mode, sends a sleep request message (hereinafter, referred to as an SLP-REQ message) to a base station 20 (S31). The subscriber terminal 10 sends a minimum size value (e.g. a min-window) and a maximum size value (e.g. a max-window) of a sleep interval window according to its configuration, and a value of a listening interval, that is, a time interval during which the corresponding terminal awakes and determines if a message has become received. The unit of these values is a frame.

Next, the base station 20 having received the SLP-REQ message performs a sleep time scheduling with reference to preset sleep control information (e.g. the min-window, the max-window, and the listening interval which are allowable) (S32), and then sends a sleep response message (hereinafter, referred to as an SLP-RSP message) to the subscriber terminal 10 (S33). This SLP-RSP message includes the number of frames (hereinafter, referred to as a start-time) which remain until the subscriber terminal 10 enters the sleep mode, and a min-window value, a max-window value and a listening interval value which are approved by the base station 20. The unit of these values is a frame.

The subscriber terminal 10 having received the SLP-RSP message enters the sleep mode at the start-time included in the SLP-RSP message (S34). The subscriber terminal 10 awakes from the sleep mode after the sleep interval passes, and checks whether or not there exist PDU data which it should receive from the base station 20. That is, if the sleep interval passes, the subscriber terminal 10 enters an awake mode (S35) and checks a traffic-indication message (hereinafter, referred to as a TRF-IND message) which is broadcast by the base station 20 during the listening interval (S36). The TRF-IND message is information which the base station 20 broadcasts to the subscriber terminal 10, and includes basic connection identification (CIDs) of a terminal to which PDU data should be transmitted.

The subscriber terminal 10 determines whether or not its own basic CIDs (BCIDs) are included in the TRF-IND message and then determines whether or not to awake form the sleep mode. That is, when the terminal's own BCIDs are included in the received TRF-IND message, the subscriber terminal 10 recognizes that there are PDU data to be received, and thus awakes from the sleep mode. If the TRF-IND message having been received by the subscriber terminal 10 is a positive traffic indication (S37), the subscriber terminal 10 is shifted to an active mode (S38).

In contrast, when the terminal's own BCIDs are not included in the received TRF-IND message, the subscriber terminal 10 determines that no PDU data exists to be transmitted to the subscriber terminal 10, and enters the sleep mode again. If the TRF-IND message having been received by the subscriber terminal 10 is a negative traffic indication, the subscriber terminal 10 is shifted to the sleep mode (S34) and then maintains the sleep mode during the sleep interval.

When the TRF-IND message is not the positive traffic indication in step S37, the subscriber terminal 10 increases the sleep interval by twice as long as the prior sleep interval (S39) and then maintains the sleep mode during the increased sleep interval. The subscriber terminal 10 repeats the sleep mode and the awake mode until it is shifted to the active mode, and increases the sleep interval by twice as long as the prior sleep interval every repetition period until the sleep interval comes into the max-window which the base station 20 permits. In this way, the IEEE 802.16e communication system drives the sleep mode while increasing the sleep interval by twice as long as the prior sleep interval by means of the above-mentioned sleep update algorithm. Accordingly, in the IEEE 802.16e communication system, a sleep interval becomes increased according to an exponential power of 2, which makes it difficult for a base station to manage each sleep interval of a plurality of subscriber terminals.

In the IEEE 802.16e communication system, three messages, that is, a SLP-REQ message, a SLP-RSP message, and a TRF-IND message, are defined between a subscriber terminal and a base station in order for the subscriber terminal to enter a sleep mode.

Figure 2A:
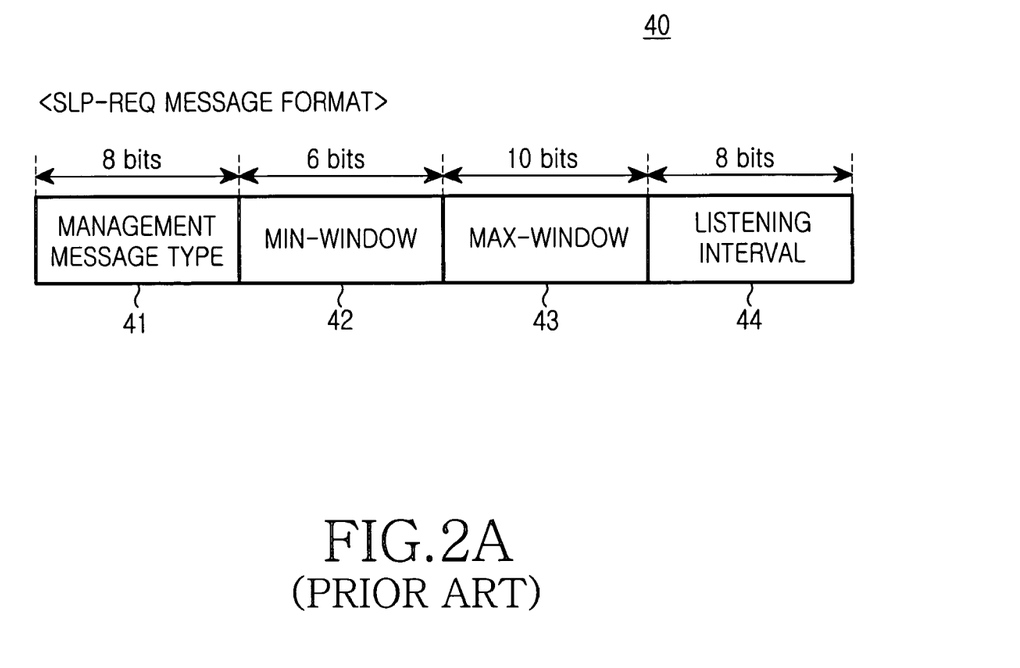
FIGS. 2a to 2d are views showing conventional message formats transceived between a base station and a subscriber terminal in order to control a sleep mode.
Figure 2B:
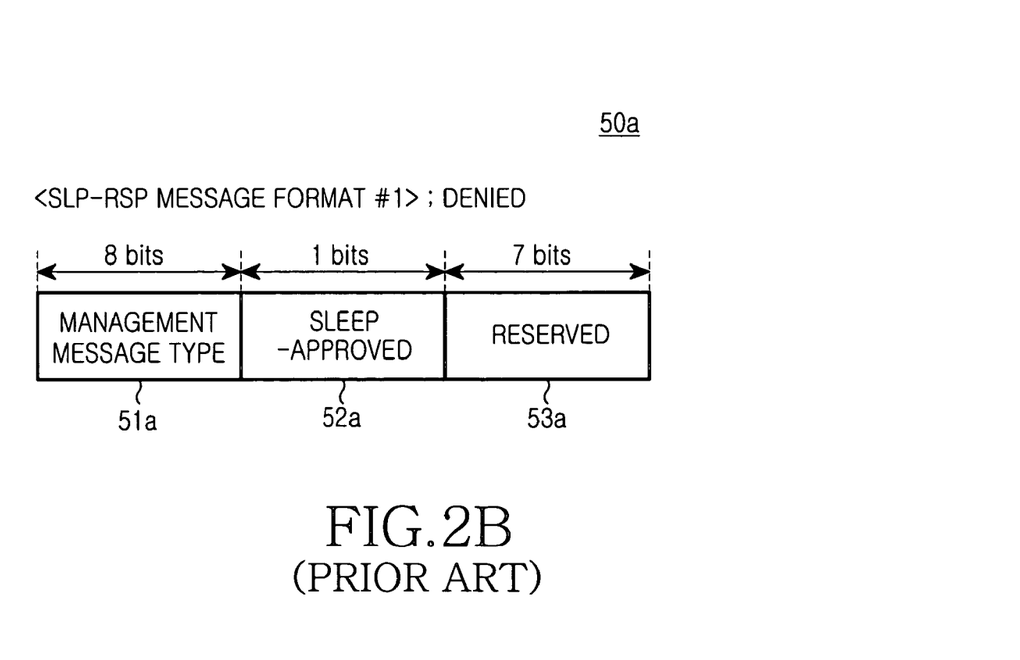
Figure 2C:
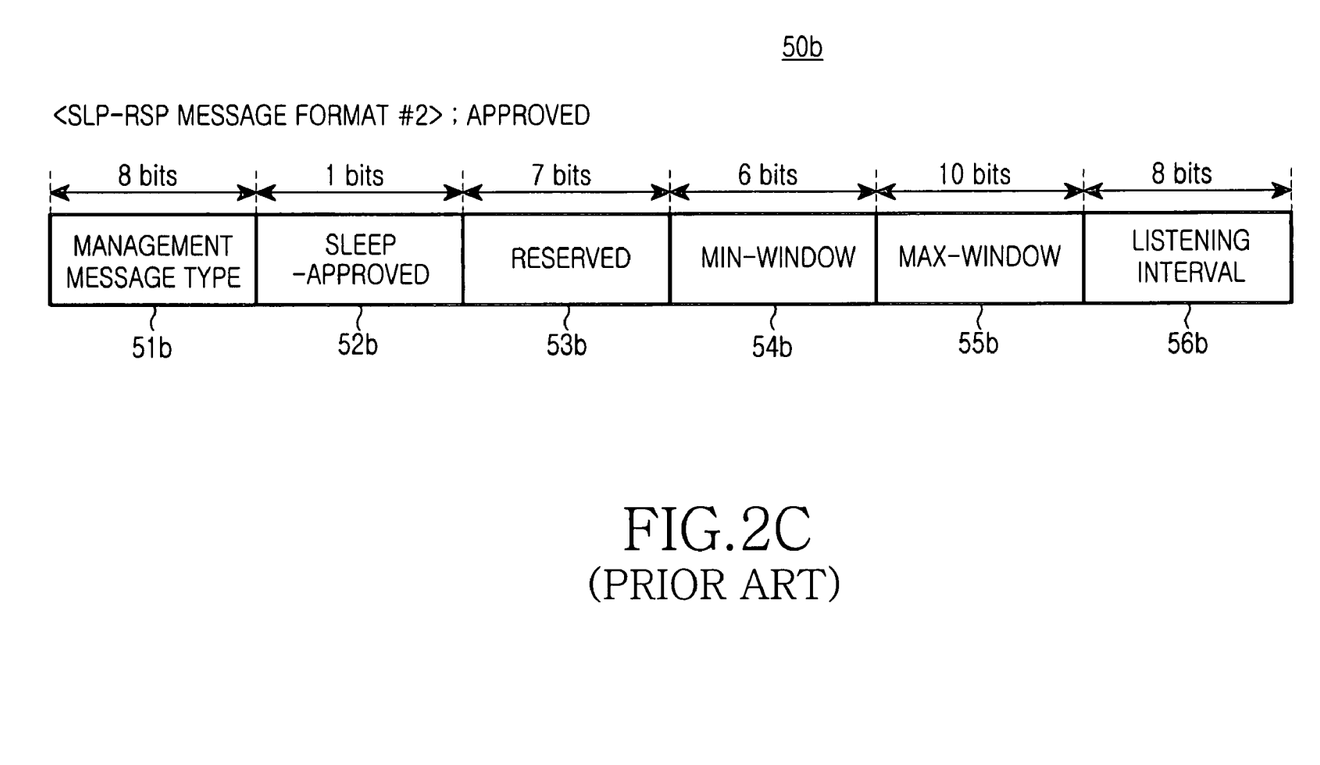
Figure 2D:
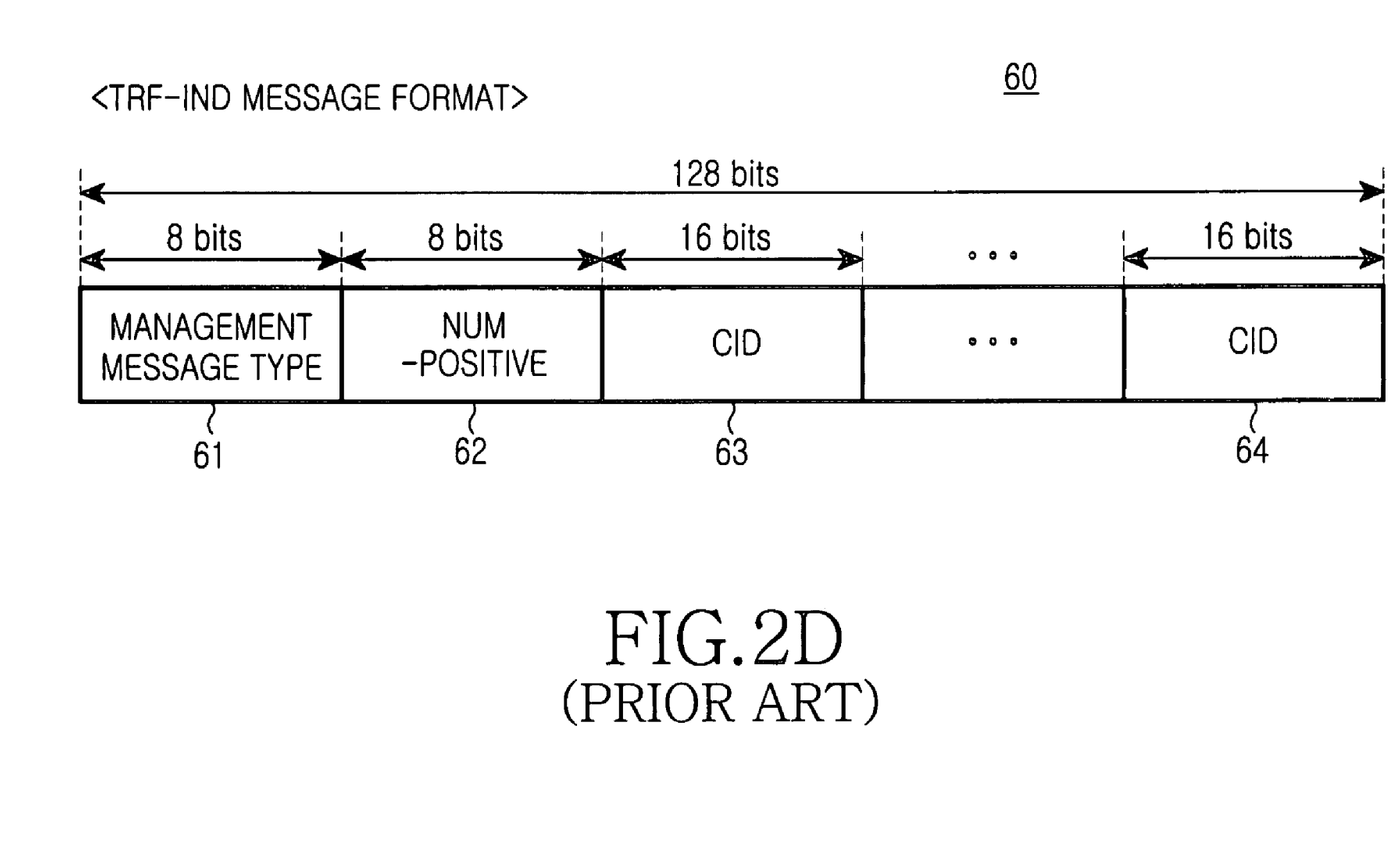

FIGS. 2a to 2d are views showing conventional message formats transceived between a base station and a subscriber terminal in order to control the sleep mode as described above. That is, FIG. 2a shows a format of a SLP-REQ message 40, FIG. 2b shows a format of a SLP-RSP message 50a used in denying a sleep mode, FIG. 2c shows a format of a SLP-RSP message 50b used in approving a sleep mode, and FIG. 2d shows a format of a TRF-IND message 60.

Referring to FIG. 2a, the SLP-REQ message 40 includes a management message type (8 bits) 41, a min-window (6 bits) 42, a max-window (10 bits) 43, and a listening interval (8 bits) 44. The SLP-REQ message 40 is a dedicated message transmitted on the basis of a connection ID (CID) of a subscriber terminal, representing a request of a sleep mode by the subscriber terminal.

Herein, the management message type 41 is information representing the message types that are currently being transmitted. For instance, when the management message type is '45', it means that the corresponding message is an SLP-REQ message. The management message type 41 consists of 8 bits.

The min-window 42 represents a start value requested for the sleep interval (measured in frames), and the max-window 43 represents a stop value requested for the sleep interval (measured in frames). That is, the sleep interval is updated while being increased according to an exponential power of 2 of the min-window value within a range from the min-window value to the max-window value.

The listening interval 44 represents a requested listening interval (measured in frames).

Herein, all of the min-window 42, the max-window 43, and the listening interval 44 are set in the unit of a frame.

Referring to FIG. 2b, the SLP-RSP message 50a used in denying a sleep mode request includes a management message type (8 bits) 51a, a sleep-approved area (1 bit) 52a, and a reserved area (7 bits) 53a. This SLP-RSP message 50a is a dedicated message transmitted on the basis of the connection ID (CID) of the subscriber terminal, and is a message setting a sleep timing of a the subscriber terminal after scheduling of a sleep time of the subscriber terminal in a base station.

Herein, the management message type 51a is information representing the message types that are currently being transmitted. For instance, when the management message type is '46', it means that the corresponding message is an SLP-RSP message.

The sleep-approved area 52a is expressed in 1 bit. When the sleep-approved area 52a is zero, the subscriber terminal cannot be shifted to the sleep mode. The reserved area 53a is an preparatory area.

Referring to FIG. 2c, the SLP-RSP message 50b, which is transmitted to a subscriber terminal when a base station approves a sleep request, includes a management message type (8 bits) 51b, a sleep-approved area (1 bit) 52b, a start-time (7 bits) 53b, a min-window 54b, a max-window 55b and a listening interval 56b.

The management message type 51b is information representing the message types that are currently being transmitted. For instance, when the management message type is '46', it means that the corresponding message is an SLP-RSP message.

The sleep-approved area 52b is expressed in 1 bit. When the sleep-approved 52b is '1', the sleep-mode request is approved.

The start-time 53b represents values of frames required until the subscriber terminal enters a first sleep interval, from which a frame having received the SLP-RSP message is excluded. The subscriber terminal is state-transited into the sleep mode after passing through frames from a frame positioned next to a frame receiving the sleep mode response message to frames corresponding to the start time.

The min-window 54b represents a start value for the sleep interval (measured in frames), the max-window 55b represents a stop value for the sleep interval (measured in frames), and the listening interval 56b represents a value for a listening interval (measured in frames).

Referring to FIG. 2d, the TRF-IND message 60 includes a management message type (8 bits) 61, the number of positive subscribers (NUM-POSITIVE) (8 bits) 62 and connection Ids CIDs of the respective positive subscribers (16 bits) 63 and 64. Differently from the SLP-REQ message and the SLP-RSP message, the TRF-IND message 60 is transmitted in a broadcasting method.

First, the management message type 61 is information representing the message types that are currently being transmitted. For instance, when the management message type 61 is '47', it means that the corresponding message is a TRF-IND message.

The number of positive subscribers 62 represents the number of subscriber terminals to which packet data will be transmitted, and the connection IDs of the respective positive subscriber 63 and 64 include connection identification information the number of which corresponds to the number of the positive subscribers.

Figure 3:
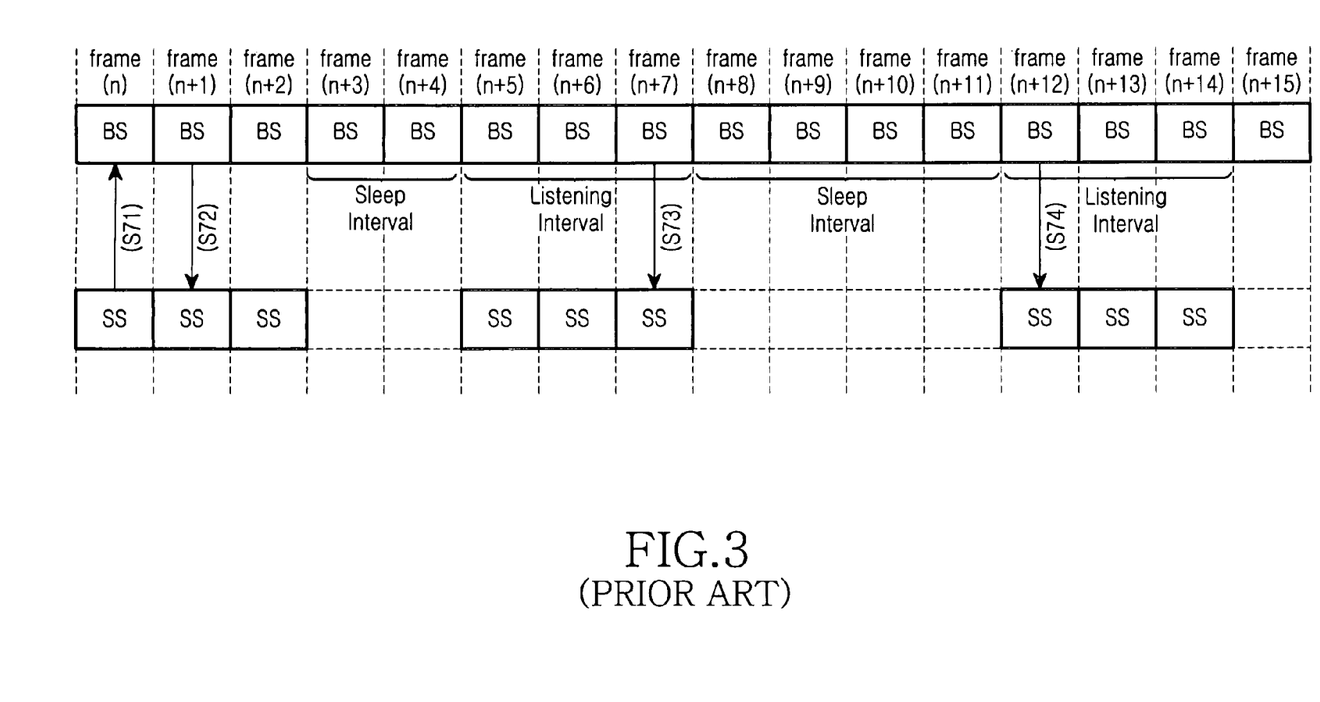
FIG. 3 is a diagram illustrating a conventional sleep interval update algorithm.

FIG. 3 is a diagram for explaining a conventional sleep interval update algorithm proposed by the IEEE 802.16e communication system. In FIG. 3, a reference mark 'SS' represents a subscriber terminal, a reference mark 'BS' represents a base station, and a box in which the 'SS' and 'BS' are written represents a frame.

FIG. 3 shows that the subscriber terminal SS requests a sleep mode to the base station BS at Nth frame (S71), and repeats a sleep interval and a listening interval when the base station BS responds to the sleep request by designating a sleep mode start time as (N+3)th frame at (N+1)th frame (S72). The initial sleep interval consists of two frames, but the second sleep interval consists of four frames corresponding to twice as many as the initial sleep interval.

In the typical IEEE 802.16e communication system as described above, since subscriber terminals request a sleep mode at different time points and sleep intervals of the subscriber terminals become increased according to an exponential power of 2, it is difficult for a base station to manage the sleep intervals of the subscriber terminals. Further, it is difficult to manage the subscriber terminals in a group unit.

SUMMARY OF THE INVENTION

Accordingly, the present invention has been made to solve the above-mentioned problems occurring in the prior art, and a first object of the present invention is to provide a method for controlling a sleep mode in a wireless access communication system, which enables a base station to easily manage sleep intervals of subscriber terminals.

A second object of the present invention is to provide a method for controlling a sleep mode, which can reduce the amount of traffic for a broadcasting message transmission by grouping subscriber terminals and managing in a base station the grouped the subscriber terminals of a wireless access communication system.

A third object of the present invention is to provide a method for controlling a sleep mode, which can reduce the amount of traffic between a subscriber terminal and a base station by not transmitting information for a sleep interval scheduling when a subscriber terminal is state-transited into a sleep mode.

In order to accomplish the aforementioned objects, according to one aspect of the present invention, there is provided a method for controlling a sleep mode by a base station in a wireless access communication system including the base station and subscriber terminals, the method including generating a group identifier by using a connection identifier of a subscriber station; assigning the connection identifier to the subscriber terminal; receiving a sleep request (SLP-REQ) message included a index value from the subscriber terminal; determining the index value from among a plurality of the index values based on a negotiation between the base station and the subscriber terminal and transmitting a sleep response (SLP-RSP) message including the determined index value to the subscriber terminal; and determining a listening position by using the group identifier of the subscriber terminal that transmits the SLP-REQ message and the determined index value.

In order to accomplish the aforementioned objects, according to another aspect of the present invention, there is provided a method for controlling a sleep mode by a subscriber terminal in a wireless access communication system including a base station and subscriber terminals, the method comprising receiving a connection identifier which is generated by a group identifier from the base station; transmitting a sleep request (SLP-REQ) message including a index value which is a sleep period setting information; receiving a sleep response (SLP-RSP) message including the index value from among a plurality of index values from the base station; and determining an awake frame by using the index value included in the SLP-RSP message and the connection identifier.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configuration incorporated herein will be omitted when it may obscure the subject matter of the present invention.

Figure 4:
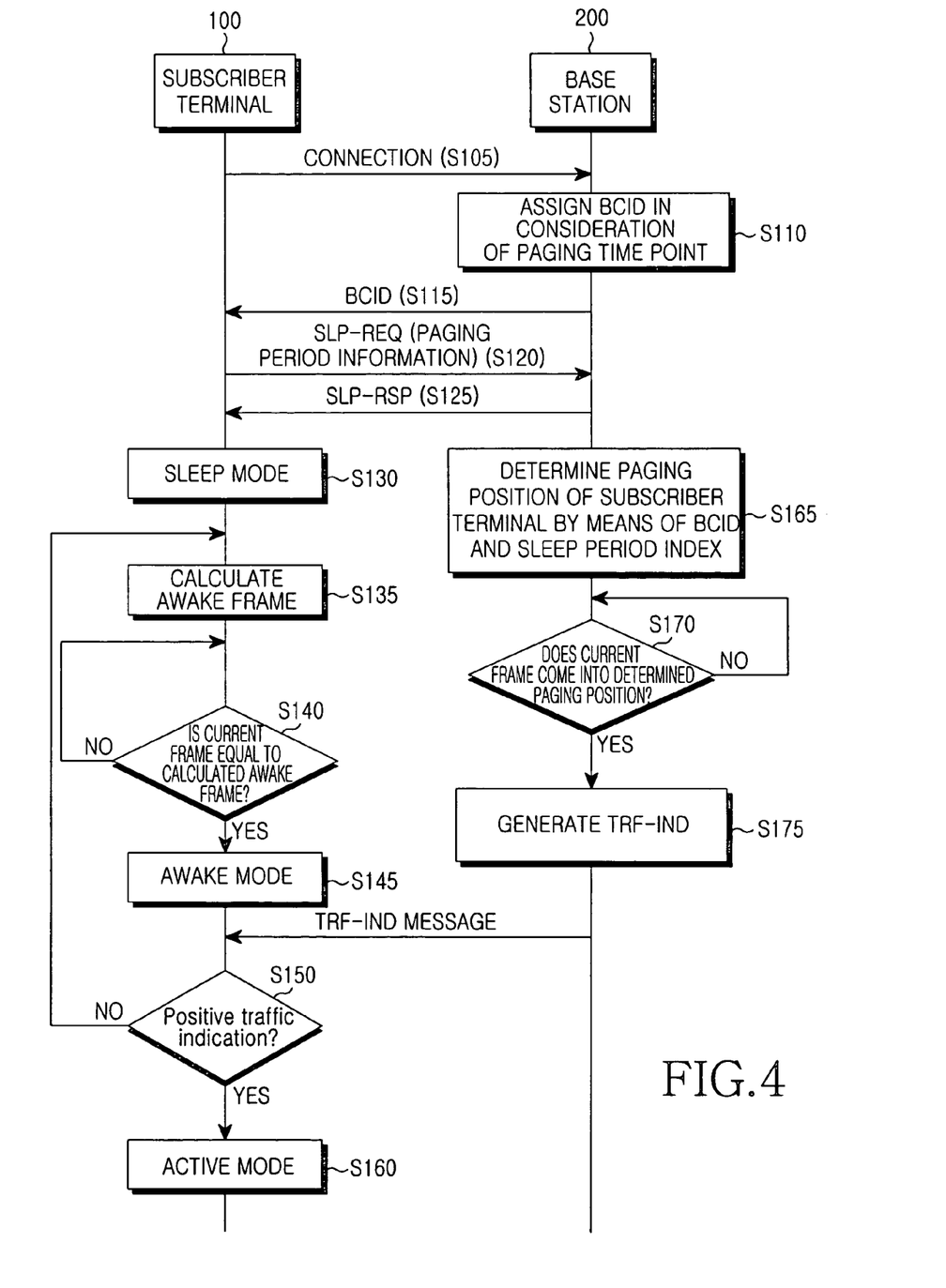
FIG. 4 is a flowchart illustrating processing procedures between a base station and a subscriber terminal for controlling a sleep mode according to one embodiment of the present invention.

FIG. 4 is a flowchart illustrating processing procedures between a base station and a subscriber terminal for controlling a sleep mode according to an embodiment of the present invention.

Referring to FIG. 4, in order to control a sleep mode according to one embodiment of the present invention, a base station and a subscriber terminal in a wireless access communication system must perform a step of sharing multiple preset index values (SI: sleep period indexes) (hereinafter, referred to as an index value) for controlling a sleep period. Herein, the index value has multiple values of a preset sleep unit time [e.g. frame (256 frame)] "F". It is preferable that the SI is set as four numerals (i.e. 00, 01, 10, 11) expressed in a 2 bit value. That is, the base station and the subscriber terminal must already know that the four numerals are used as the index value.

A relation between this index value and a sleep period (hereinafter, referred to as a_P) is expressed by the following equation 1.

$$P=F*(SI+1) \tag{1}$$

where P represents a sleep period set in the subscriber terminal, F represents a preset sleep unit time, and SI represents sleep period setting information such as the index value. For example, in the case in which F is 256 frames, when SI such as the index value is '00($0_{10}$)', the base station transmits a broadcasting message to the subscriber terminal, and P, in which the subscriber terminal awakes to check the messages, is 256 frames [equal to 256 frames*(0+1)]. Further, when SI is '01($1_{10}$)', P is 512 frames [equal to 256 frames*(1+1)]. When SI is '10($2_{10}$)', P is 768 frames [equal to 256 frames* (2+1)]. When SI is '11($3_{10}$)', the 'P' is 1024 frames [equal to 256 frames*(3+1)].

Referring now to FIG. 1 in the case in which the base station 200 and the subscriber terminal 100 share SI, when the subscriber terminal 100 is connected to the base station 200 (S105), the base station 200 assigns predetermined a basic connection ID (hereinafter, referred to as a BCID) to the subscriber terminal 100 (S110 and S115). When all initial terminals are initialized as a same SI, the base station 200 assigns the same predetermined number of ciphers of the BCID to terminals which will be formed into a group having the same sleep start time. For example, the base station typically selects low-ranked 8 bits from 16 bits forming a BCID of the subscriber terminal as a value (e.g., group identifier) achieving a group having the same sleep start time. Accordingly, subscriber terminals, which receive the BCID having the same value of low-ranked 8 bits from the base station, start an operation of a sleep mode at the same time point. Also, a separate bit value for achieving the group having the same sleep start time may be generated and added. Further, the base station 200 waits for a sleep request by the subscriber terminal 100. In this case, the maximum number of the groups having the same sleep start time is 1024 ($2^8*4$, the number of SI).

Also, in order to state-transit into a sleep mode, the subscriber terminal 100 selects one from among the index values (e.g. 00, 01, 10, 11), and transmits a sleep request message (hereinafter, referred to as an SLP-REQ message) including the selected index value to the base station 200 (S120). Herein, the index value is the same as description described above.

Next, the base station 200 receiving the SLP-REQ message transmits to the subscriber terminal 100 a response message SLP-RSP, which responds to the sleep request, (S125). Herein, the response message includes whether or not the index value selected by the subscriber terminal 100 can be approved.

For instance, when the index value selected by the subscriber terminal 100 can be approved, the base station 200 transmits the response message containing the index value. Otherwise, the base station 200 transmits a response message containing another index value which can be approved.

Further, the subscriber terminal 100 receiving the response message determines a sleep start time by the BCID received from the base station 200 in step S115, and calculates an awake frame (i.e. a listening position) of the subscriber terminal 100 by means of the BCID and the index value contained in the received response message in step S125 (S135).

When the awake frame period of the subscriber terminal 100 is calculated in step S135, the subscriber terminal 100 determines whether or not a current frame is equal to the awake frame calculated in step S135 (S140). When the current frame is equal to the awake frame calculated in step S135, the subscriber terminal 100 operates in an awake mode (S145). That is, the subscriber terminal 100 awakes and checks a broadcasting message (hereinafter, referred to as a TRF-IND message) transmitted to itself.

In contrast, from the result of the determination (S140), when the current frame is not equal to the awake frame calculated in step S135, the subscriber terminal 100 operates in the sleep mode (S155).

Also, when the subscriber terminal 100 operating in the awake mode in step S145 receives the TRF-IND message from the base station 200, the subscriber terminal 100 checks whether or not a BCID of the subscriber terminal 100 is included in the received TRF-IND message (S150). The subscriber terminal 100 checks whether or not the received TRF-IND message is a positive traffic indication. From the result of the check (S150), when the received TRF-IND message is a positive traffic indication, the subscriber terminal 100 state-transits into an active mode (S160). In contrast, when the received TRF-IND message is not the positive traffic indication, the subscriber terminal 100 re-shifts to the sleep mode (S155).

The base station 200 transmitting a SLP-RSP message to the subscriber terminal 100 in step S125 determines a listening position of the subscriber terminal 100 by means of the BCID of the corresponding subscriber terminal 100 and an index value included in the SLP-RSP message (S165). Herein, it is preferred that the base station 200 determines a listening position based on Equation 2.

$$Sb*(SI+1) = FN \bmod (F*(SI+1)) \quad (2)$$

where Sb represents a BCID set in a corresponding subscriber terminal, F represents a preset sleep unit time, SI represents an index value, and FN (24 bits) represents a frame number corresponding to a listening position. It is preferred that Equation 2 is used in step 125.

When the current frame comes into the determined listening position (S170), the base station 200 generates the TRF-IND message which includes the BCID of the subscriber terminal 100 (S175), and then transmits the generated TRF-IND message to the subscriber terminal 100.

Figure 5:
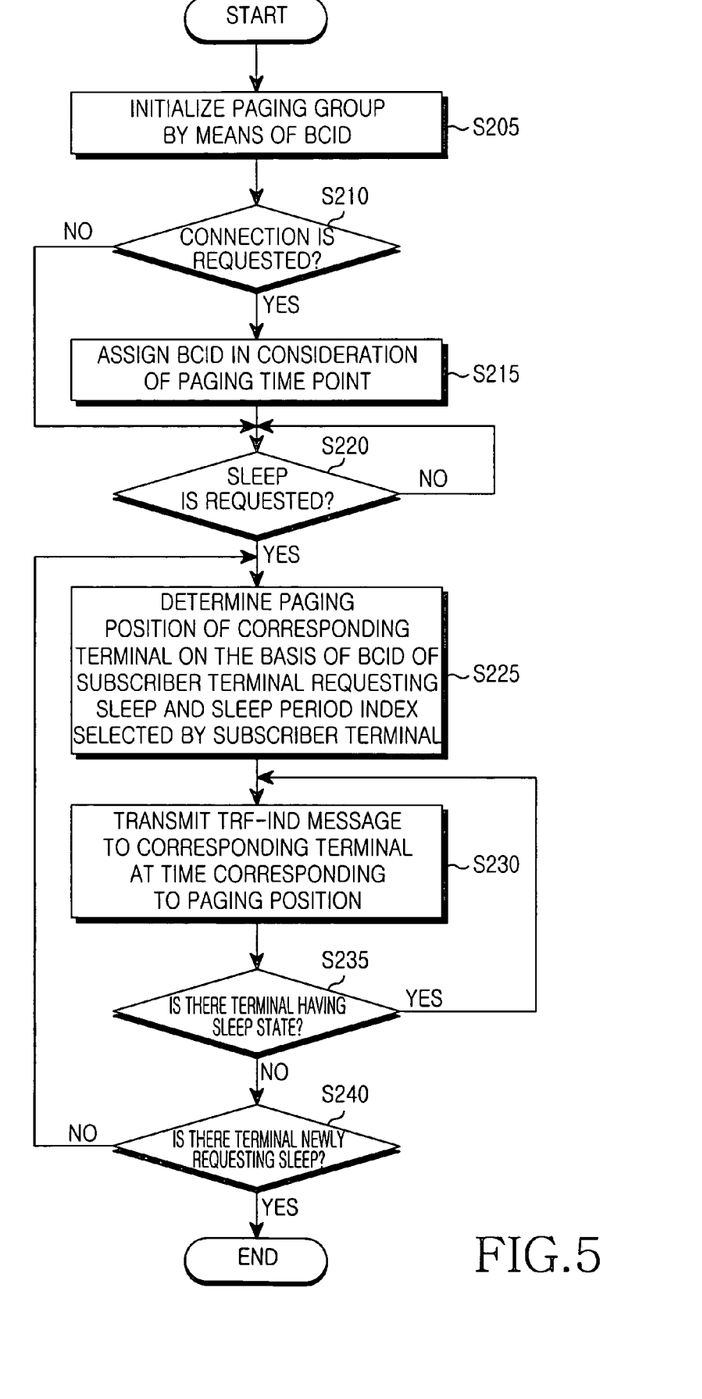
FIG. 5 is a flowchart illustrating steps performed by the base station in order to control a sleep mode according to one embodiment of the present invention.
Figure 6:
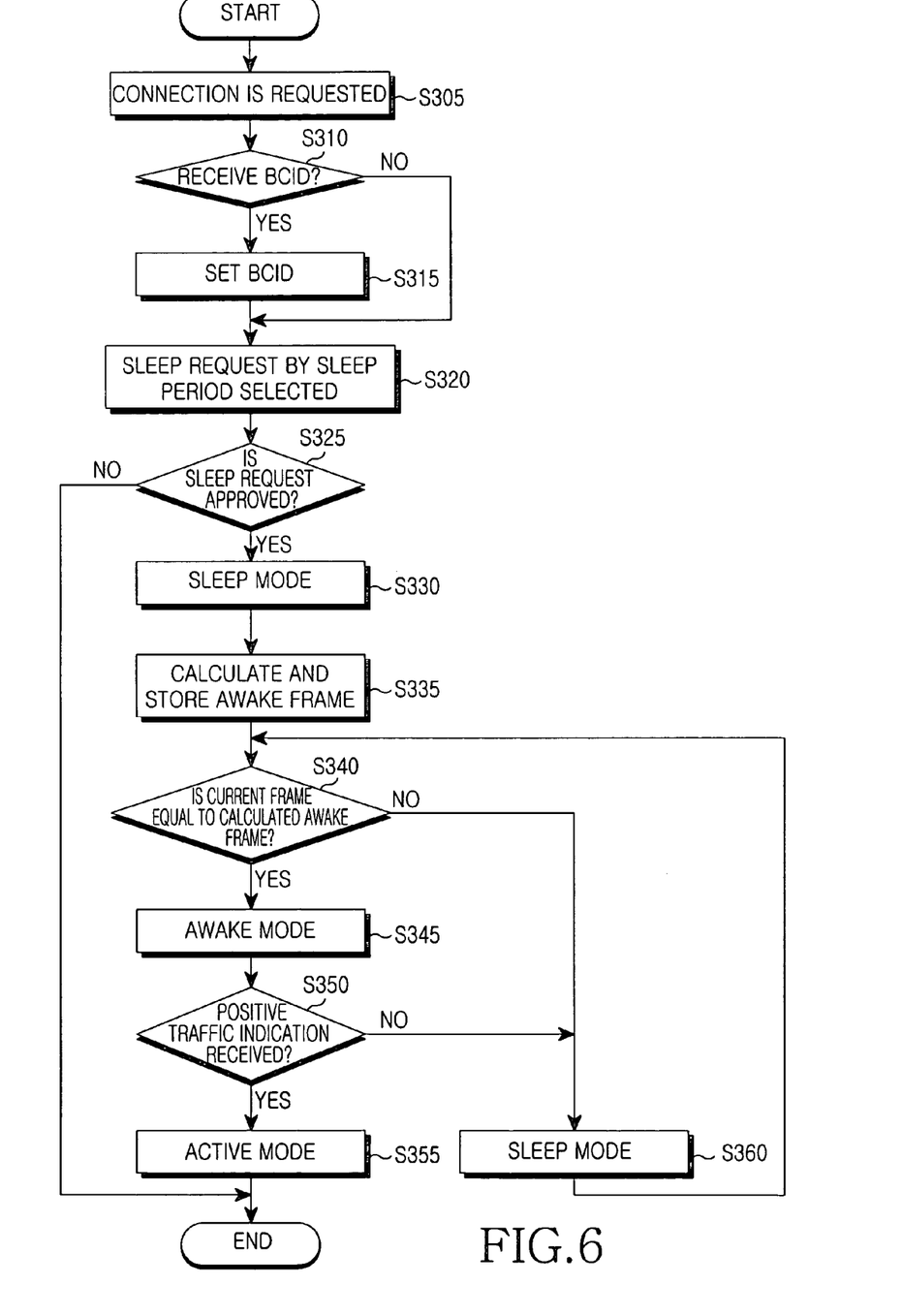
FIG. 6 is a flowchart illustrating steps performed by the subscriber terminal in order to control a sleep mode according to one embodiment of the present invention.

FIGS. 5 and 6 are flowcharts illustrating steps for processing the above mentioned process in the base station and the subscriber terminal, respectively.

FIG. 5 is a flowchart illustrating steps performed by the base station in order to control the sleep mode according to an embodiment of the present invention. Referring to FIG. 5, in order to control the sleep mode according to the embodiment of the present invention, the base station initializes a listening group by the BCID of the subscriber terminal connected to the a corresponding base station (S205). Initializing a listening group signifies that the base station sets a sleep start time according to the BCID of the subscriber terminal.

Next, when the subscriber terminal requests a connection (S210), the base station assigns the BCID to the subscriber terminal (S215). When a SLP-REQ message is received from the subscriber terminal (S220), the base station determines a listening position of the corresponding subscriber terminal on the basis of the BCID of the subscriber terminal requesting a sleep mode and the index value selected by the subscriber terminal (S225). When the index value selected by the subscriber terminal is improper, the base station assigns another index value to the subscriber terminal and determines a listening position of a corresponding subscriber terminal by means of the index value.

Next, the base station transmits the TRF-IND message to the corresponding subscriber terminal at a time corresponding to the determined listening position (S230). This step (S230) repeats while terminals having a sleep state exist. Further, when there are no terminals having the sleep state (S235), the base station understands whether or not there are terminals newly requesting a sleep mode from among subscriber terminals connected in advance (S240). From the result of the understanding, when there are terminals newly requesting the sleep, the base station repeats the steps (S225 to S235).

FIG. 6 is a flowchart illustrating steps performed by the subscriber terminal in order to control a sleep mode according to one embodiment of the present invention. Referring to FIG. 6, the steps performed by the subscriber terminal in order to control the sleep mode according to one embodiment of the present invention is as follows.

The subscriber terminal requests a connection to a random base station (S305), receives a BCID from the base station (S310), and sets a BCID of the subscriber terminal (S315). The subscriber terminal selects a preset index value to request the sleep mode in order to control a sleep period (S320). The subscriber terminal selects a random one from among the preset predetermined number of index values and then requests the sleep mode.

When the sleep mode request is approved by the base station (S325), the subscriber terminal state-transits to the sleep mode (S330). The subscriber terminal calculates and stores an awake frame (i.e., listening position) of the subscriber terminal by means of the BCID of the corresponding subscriber terminal and the index value (the value designated by the subscriber terminal or the value designated by the base station) approved by the base station (S335). The awake frame of the subscriber terminal is calculated by equation 2.

When a current frame is equal to the calculated awake frame, the subscriber terminal 100 changes the sleep mode into the awake mode (S345). Since the next steps S350, S355, and S360 correspond to steps S150, S160, and S155 in FIG. 4, a description for steps S350, S355, and S360 is omitted.

Figure 7A:
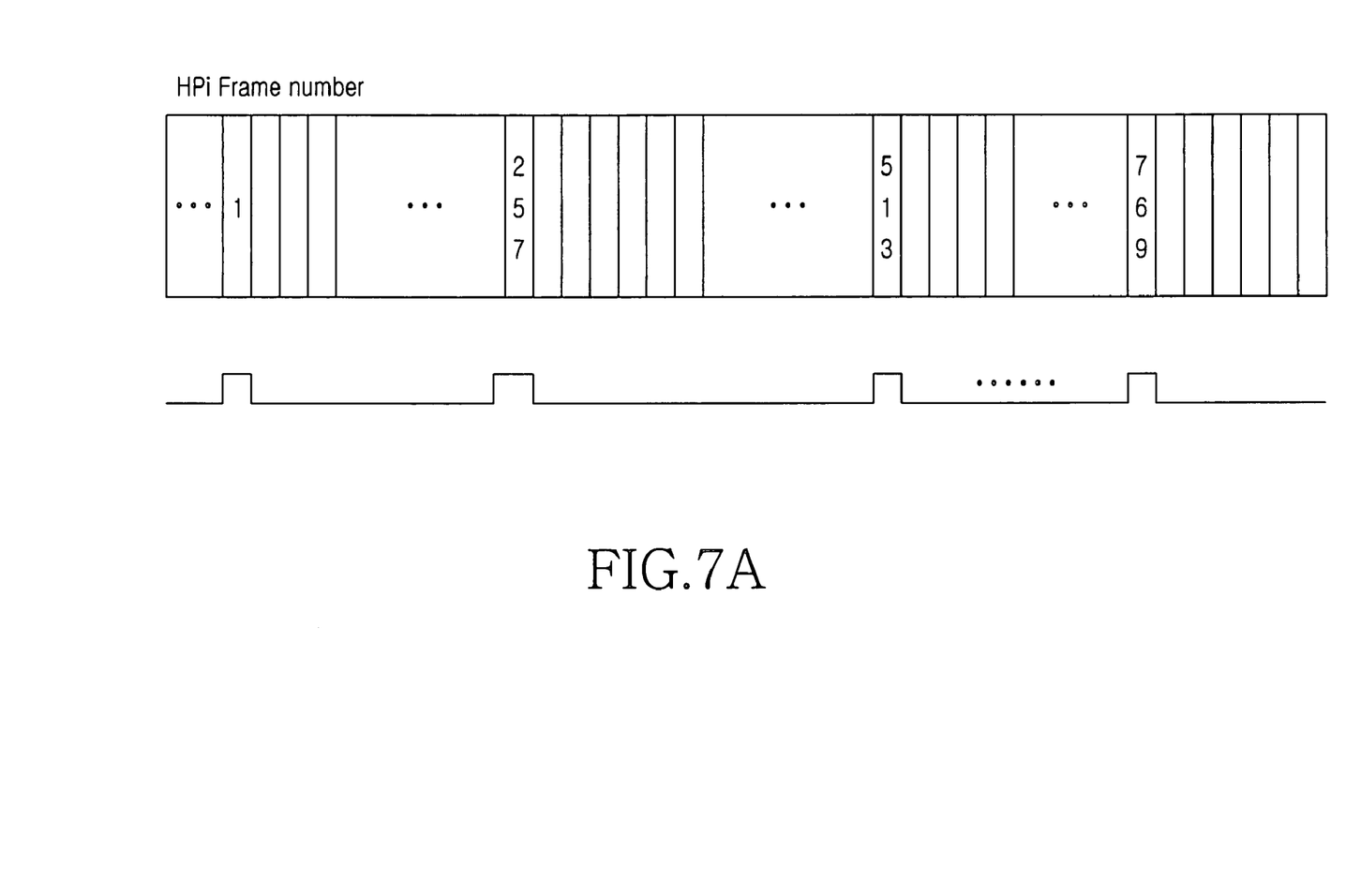
FIGS. 7a to 7b are views illustrating an example in which a sleep mode is controlled by a sleep mode control method according to an embodiment of the present invention.
Figure 7B:
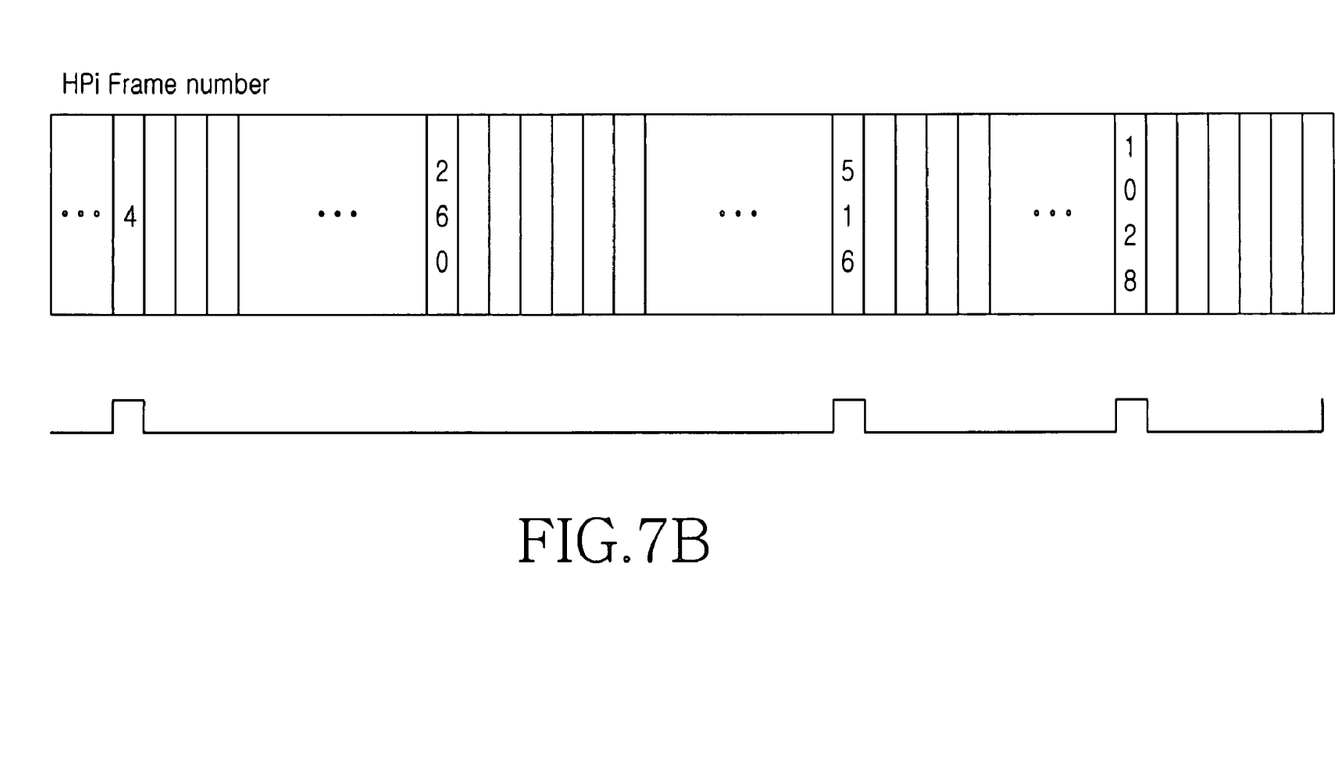

FIGS. 7a to 7b are views illustrating an example in which a sleep mode is controlled by a sleep mode control method according to an embodiment of the present invention.

FIG. 7a shows an example in which the BCID of the subscriber terminal is 0x0001 and the SI has a value of '$0_{10}$'.

If the values are putted into equation 2, the following equation 3 is obtained.

$$1 = FN \bmod(256*(0+1)) \quad (3)$$

where the start time is 1, and listening position is a set of numerals having a remainder of 1 if divided by 256, [i.e. numerals of (multiples of 256)+1]. listening position is identical to the listening position shown in FIG. 7a.

FIG. 7b shows an example in which the BCID of the subscriber terminal is 0x1002 and the SI has a value of '$1_{10}$'.

If the values are input into equation 2, the following equation 4 is obtained.

$$4 = FN \bmod(256*(1+1)) \quad (4)$$

where the start time is '4', and listening position is a set of numerals having a remainder is '4' if divided by 512. listening position is identical to the listening position shown in FIG. 7b.

As a result, since subscriber terminals having the same index values from among the subscriber terminals having the same group identifiers have the same sleep start times and the same listening periods, the subscriber terminals have the same listening positions.

In a method for controlling a sleep mode in a wireless access communication system, the base station and the subscriber terminal share the predetermined number of SI for the sleep mode control, and the base station sets the paging position by means of the predetermined BCID assigned to subscriber terminals and the SI, so that the base station can easily manage sleep intervals of the subscriber terminals. Further, since information for a sleep interval scheduling is not transmitted when the subscriber terminal state-transits to the sleep mode, traffic amount between the subscriber terminal and the base station can be reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling a sleep mode by a base station in a wireless access communication system including the base station and subscriber terminals, the method comprising the steps of:
   a) generating a group identifier by using a connection identifier of a subscriber terminal;
   b) assigning the connection identifier to the subscriber terminal;
   c) receiving a sleep request (SLP-REQ) message including an index value from the subscriber terminal;
   d) determining the index value from among a plurality of index values based on a negotiation between the base station and the subscriber terminal, and transmitting a sleep response (SLP-RSP) message including the determined index value to the subscriber terminal; and
   e) determining a listening position by using the group identifier of the subscriber terminal that transmits the SLP-REQ message and the determined index value.

2. The method as claimed in claim 1, wherein the group identifier is used to determine a start time of a sleep mode for grouping the subscriber terminal.

3. The method as claimed in claim 2, wherein the group identifier uses an inherent basic connection identification.

4. The method of claim 3, further including a step of generating and transmitting a traffic-indication message, which contains a basic connection ID of a corresponding subscriber terminal, at a time corresponding to the listening position.

5. The method of claim 2, further including a step of generating and transmitting a traffic-indication message, which contains a basic connection ID of a corresponding subscriber terminal, at a time corresponding to the listening position.

6. The method as claimed in claim 1, wherein the index value is determined by a response of the base station when the subscriber terminal selects and requires an index values.

7. The method of claim 6, further including a step of generating and transmitting a traffic-indication message, which contains a basic connection ID of a corresponding subscriber terminal, at a time corresponding to the listening position.

8. The method as claimed in claim 1, wherein the index value has multiple values of a preset sleep period unit time and determines the listening position.

9. The method of claim 8, further including a step of generating and transmitting a traffic-indication message, which contains a basic connection ID of a corresponding subscriber terminal, at a time corresponding to the listening position.

10. The method as claimed in claim 1, wherein step c) is performed simultaneously and independently by the subscriber terminal and the base station.

11. The method as claimed in claim 10, wherein the listening position is determined by $$Sb*(SI+1) = FN \bmod\{F*(SI+1)\}$$

where Sb represents a group identifier, SI represents an index value, F represents a preset sleep unit time, and FN represents a frame number corresponding to a listening position.

12. The method of claim 11, further including a step of generating and transmitting a traffic-indication message, which contains a basic connection ID of a corresponding subscriber terminal, at a time corresponding to the listening position.

13. The method of claim 1, further including a step of generating and transmitting a traffic-indication message, which contains a basic connection ID of a corresponding subscriber terminal, at a time corresponding to the listening position.

14. The method of claim 1, further including a step of generating and transmitting a traffic-indication message, which contains a basic connection ID of a corresponding subscriber terminal, at a time corresponding to the listening position.

15. A method for controlling a sleep mode by a subscriber terminal in a wireless access communication system including a base station and subscriber terminals, the method comprising the steps of:
   a) receiving a connection identifier which is generated by a group identifier from the base station;
   b) transmitting a sleep request (SLP-REQ) message including an index value which is a sleep period selling information;
   c) receiving a sleep response (SLP-RSP) message including one index value from among a plurality of index values from the base station; and
   d) determining an awake frame by using the index value included in the SLP-RSP message and the connection identifier.

16. The method as claimed in claim 15, wherein the group identifier is used to determine a start time of a sleep mode for grouping the subscriber terminal.

17. The method as claimed in claim 15, wherein the index value included in the SLP-REQ message is the index value the subscriber terminal selects from among a plurality of index values.

18. The method as claims in claim 15, wherein the index value is used to determine the awake frame by applying multiple values of a preset sleep period unit time.

19. The method as claimed in claim 15, wherein step d) is performed simultaneously and independently by the subscriber terminal and the base station.

20. The method as claimed in claim 15, wherein the awake frame is determined by $$Sb*(SI+1)=FN \bmod \{F*(SI+1)\}$$

where Sb represents a group identifier, SI represents an index value. F represents a preset sleep unit time, and FN represents a frame number corresponding to the awake frame.

21. The method as claimed in claim 15, further including receiving a traffic-indication message at a time corresponding to the awake frame.

* * * * *